United States Patent [19]

Kumar

[11] Patent Number: 5,140,662
[45] Date of Patent: Aug. 18, 1992

[54] METHOD OF ASSEMBLING CONNECTOR AND CABLE

[75] Inventor: Arun Kumar, Union, N.J.

[73] Assignee: Automatic Tool & Connector Co., Inc., Union, N.J.

[21] Appl. No.: 723,789

[22] Filed: Jul. 1, 1991

[51] Int. Cl.⁵ .............................................. G02B 6/36
[52] U.S. Cl. ........................................ 385/87; 385/81; 385/85
[58] Field of Search ............... 350/96.2, 96.21, 96.22; 385/76–78, 81, 85, 86, 87

[56] References Cited

U.S. PATENT DOCUMENTS

| | | | |
|---|---|---|---|
| 3,999,837 | 12/1976 | Bowen et al. | 350/96.22 |
| 4,319,802 | 3/1982 | Bowes | 350/96.2 |
| 4,447,121 | 5/1984 | Cooper et al. | 350/96.2 |
| 4,648,688 | 3/1987 | Ashman et al. | 350/96.2 |
| 4,679,895 | 7/1987 | Huber | 385/87 |
| 4,696,537 | 9/1987 | Bauer et al. | 385/87 X |
| 4,812,009 | 3/1989 | Carlisle et al. | 350/96.21 |
| 4,834,487 | 5/1989 | Abendschein et al. | 350/96.2 |
| 4,846,564 | 7/1989 | Caron et al. | 350/96.2 |
| 4,854,664 | 8/1989 | McCartney | 350/96.22 |

*Primary Examiner*—John D. Lee
*Attorney, Agent, or Firm*—Ezra Sutton

[57] ABSTRACT

A method of attaching a connector to a fiber optic cable without using epoxy, wherein the fiber optic cable includes an outer jacket, a strength member, a buffer, and an optical fiber and wherein the connector includes a backpost, a tubular body, and a crimp sleeve having first and second diameter sections, comprising the steps of crimping the backpost and tubular body of the connector onto the buffer of the cable using a crimping tool and crimping the crimp sleeve onto the outer jacket and strength member using a crimping tool.

10 Claims, 2 Drawing Sheets

METHOD OF ASSEMBLING CONNECTOR AND CABLE

FIELD OF THE INVENTION

The present invention relates to connectors for fiber optical cables and to an efficient method for connecting the connector to the fiber optic cable.

BACKGROUND OF THE INVENTION

In the prior art, epoxy is typically used to connect the connector and the fiber optic cable. This type of method requires a curing oven to cure the epoxy.

Accordingly, it is an object of the present invention to provide a method which avoids the need for epoxy, curing and a curing oven, and the attendant costs in time and expense, and yet provides a secure and reliable connection between the cable and the connector.

SUMMARY OF THE INVENTION

In the present invention, there is provided a method of attaching a connector to a fiber optic cable wherein the fiber optic cable includes an outer jacket, a buffer, and an optical fiber and wherein the connector includes a crimp sleeve having first and second diameter sections. The method comprises the steps of sliding a strain relief boot and a crimp sleeve onto the fiber optic cable and then stripping one end of the cable to expose the Kevlar strength member, buffer, and optical fiber. The optical fiber is then inserted into the connector until the backpost of the connector butts up against the outer jacket of the cable. The backpost and tubular body of the connector are then crimped onto the buffer section of the cable using a crimping tool to make the first two mechanical connections.

Next, the crimp sleeve is slid over the tubular body and backpost of the connector, and a crimping tool is used to crimp the first diameter section of the crimp sleeve onto the outer jacket and to crimp the second diameter section of the crimp sleeve onto the Kevlar and the tubular body. Finally, the strain relief boot is slid over the crimp sleeve, and the exposed end of the optical fiber is scribed, and the scribed section is pulled off, and the remaining end is polished.

BRIEF DESCRIPTION OF THE DRAWINGS

Further objects, features, and advantages of the present invention will become apparent upon the consideration of the following detailed description of the presently-preferred embodiment when taken in conjunction with the accompanying drawings, wherein.

DETAILED DESCRIPTION OF THE PREFERRED EMBODIMENT

Figure 1:
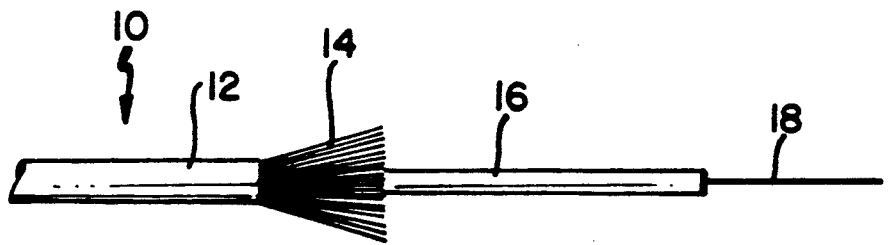
FIG. 1 is a side view of the fiber optic cable after it has been stripped.

FIG. 1 shows a fiber optic cable 10 which has an outer jacket 12 and, after it is stripped, reveals a strength member formed of Kevlar strands 14, the buffer 16, and the optical fiber 18. Preferably, the stripping should be performed so the Kelvar strands 14 are about ⅞", the buffer 16 is about 1¼", and the optical fiber 18 is about 1¾".

Before the stripping of the cable 10, a strain relief boot 20 and a crimp sleeve 22 are slid onto the cable 10.

Figure 2:
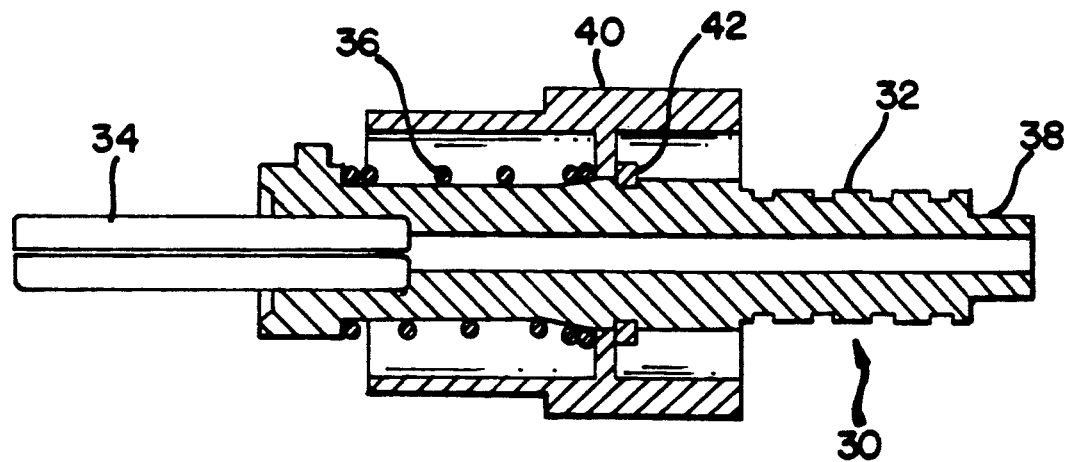
FIG. 2 is a sectional view of the connector before crimping.
Figure 3:
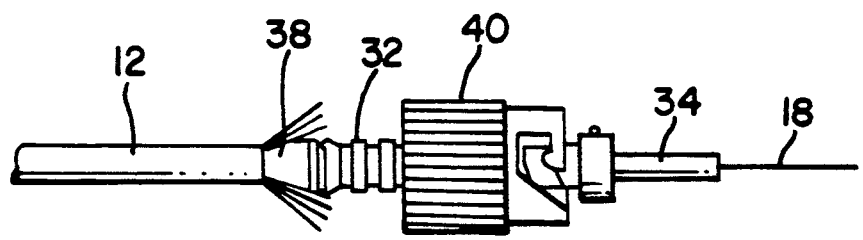
FIG. 3 is a side view of the assembled cable and connector before crimping.
Figure 4:
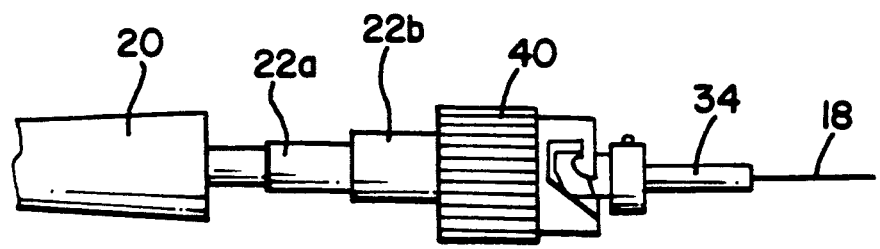
FIG. 4 is a side view showing the crimp sleeve in place and ready for crimping.
Figure 5:
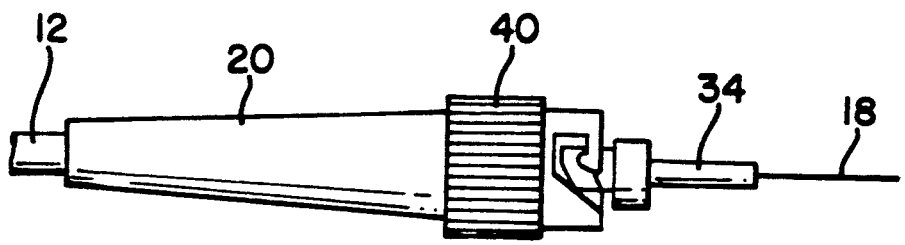
FIG. 5 is a side view with the strain relief boot in place over the crimp sleeve after crimping.

FIG. 2 shows the connector 30 which has a tubular body section 32, a metal ferrule 34 at one end, a spring 36, a backpost 38, a bayonet coupling 40, and a retaining clip 42.

The optical fiber 18 is inserted into the connector 30 while slowly rotating the connector 30 back and forth. The connector 30 is slid onto the cable 10 until the backpost 38 butts up against the outer jacket 12 of the cable 10.

A crimping tool is employed to perform the crimping steps. First, the backpost 38 is crimped onto the buffer 16 using the crimping tool, and then the tubular body 32 is crimped onto the buffer 16 using the crimping tool. In this manner, the first two mechanical connections are made to connect the connector 30 onto the cable 10.

Preferably, the crimping tool (not shown) has cavities with a hexagonal shape or cross-section to form these crimps. However, the crimps may have other shapes, such as square, round, or triangular.

To continue the process, the crimp sleeve 22 is moved along cable 10 (from the left) and into position over the Kevlar strands 14 and connector backpost 38.

A crimping tool is again employed to perform the crimping steps. The first diameter section 22a of crimp sleeve 22 is crimped onto the outer jacket 12 using the crimping tool, and the second diameter section 22b of crimp sleeve 22 is crimped onto Kevlar 14 and tubular body 32 using the crimping tool. In this manner, two more mechanical connections are made to connect the connector 30 onto the cable 10.

Preferably, the crimping tool (not shown) has cavities with a hexagonal shape or cross-section to form these crimps. However, the crimps may have other shapes, such as square, round, or triangular.

Next, the strain relief boot 20 is slid over the crimp sleeve 22, and the exposed end of the optical fiber 18 is scribed, and the scribed section is pulled off, and the remaining cut end is polished.

Advantageously, as a result of the present invention, there is provided an improved method of assembling a connector and cable that meets all necessary tests for mechanical strength and has a very low level of dB loss in the average range of 0.3 dB.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A method of attaching a connector to a fiber optic cable without using epoxy, wherein the fiber optic cable includes an outer jacket, a strength member, a buffer, and an optical fiber and wherein the connector includes a backpost, a tubular body, and a crimp sleeve having first and second diameter sections, comprising the steps of:

a) sliding a strain relief boot and the crimp sleeve onto the fiber optic cable;

b) stripping the outer jacket at one end of the cable to expose the strength member, buffer and optical fiber;
c) inserting the optical fiber into said connector until the backpost of said connector butts up against said outer jacket;
d) crimping the backpost of said connector onto the buffer of said cable using a crimping tool;
e) crimping the tubular body of said connector onto the buffer of said cable using a crimping tool;
f) sliding the crimp sleeve over the tubular body and backpost of said connector;
g) crimping the first diameter section of said crimp sleeve onto said outer jacket using a crimping tool;
h) crimping the second diameter section of said crimp sleeve onto said strength member and said tubular body using a crimping tool;
i) sliding the strain relief boot over said crimp sleeve; and
j) polishing the exposed end of the optical fiber.

2. The method of claim 1 wherein all the crimping steps form hexagonal-shaped crimps.

3. The method of claim 1 wherein all the crimping steps form square-shaped crimps.

4. The method of claim 1 wherein all the crimping steps form triangular-shaped crimps.

5. The method of claim 1 wherein all the crimping steps form round crimps.

6. A method of attaching a connector to a fiber optic cable without using epoxy, wherein the fiber optic cable includes an outer jacket, a strength member, a buffer, and an optical fiber and wherein the connector includes a backpost, a tubular body, and a crimp sleeve having first and second diameter sections, comprising the steps of:
a) sliding a strain relief boot and the crimp sleeve onto the fiber optic cable;
b) stripping the outer jacket at one end of the cable to expose the strength member, buffer, and optical fiber;
c) inserting the optical fiber into said connector unitl the backpost of said connector butts up against said outer jacket;
d) crimping the tubular body of said connector onto the buffer of said cable using a crimping tool;
e) sliding the crimp sleeve over the tubular body and backpost of said connector;
f) crimping the first diameter section of said crimp sleeve onto said outer jacket using a crimping tool;
g) crimping the second diameter section of said crimp sleeve onto said strength member and said tubular body using a crimping tool;
h) sliding the strain relief boot over said crimp sleeve; and
i) polishing the exposed end of the optical fiber.

7. The method of claim 6 wherein all the crimping steps form hexagonal-shaped crimps.

8. The method of claim 6 wherein all the crimping steps form square-shaped crimps.

9. The method of claim 6 wherein all the crimping steps form triangular-shaped crimps.

10. The method of claim 6 wherein all the crimping steps form round crimps.

* * * * *